Figure 1:
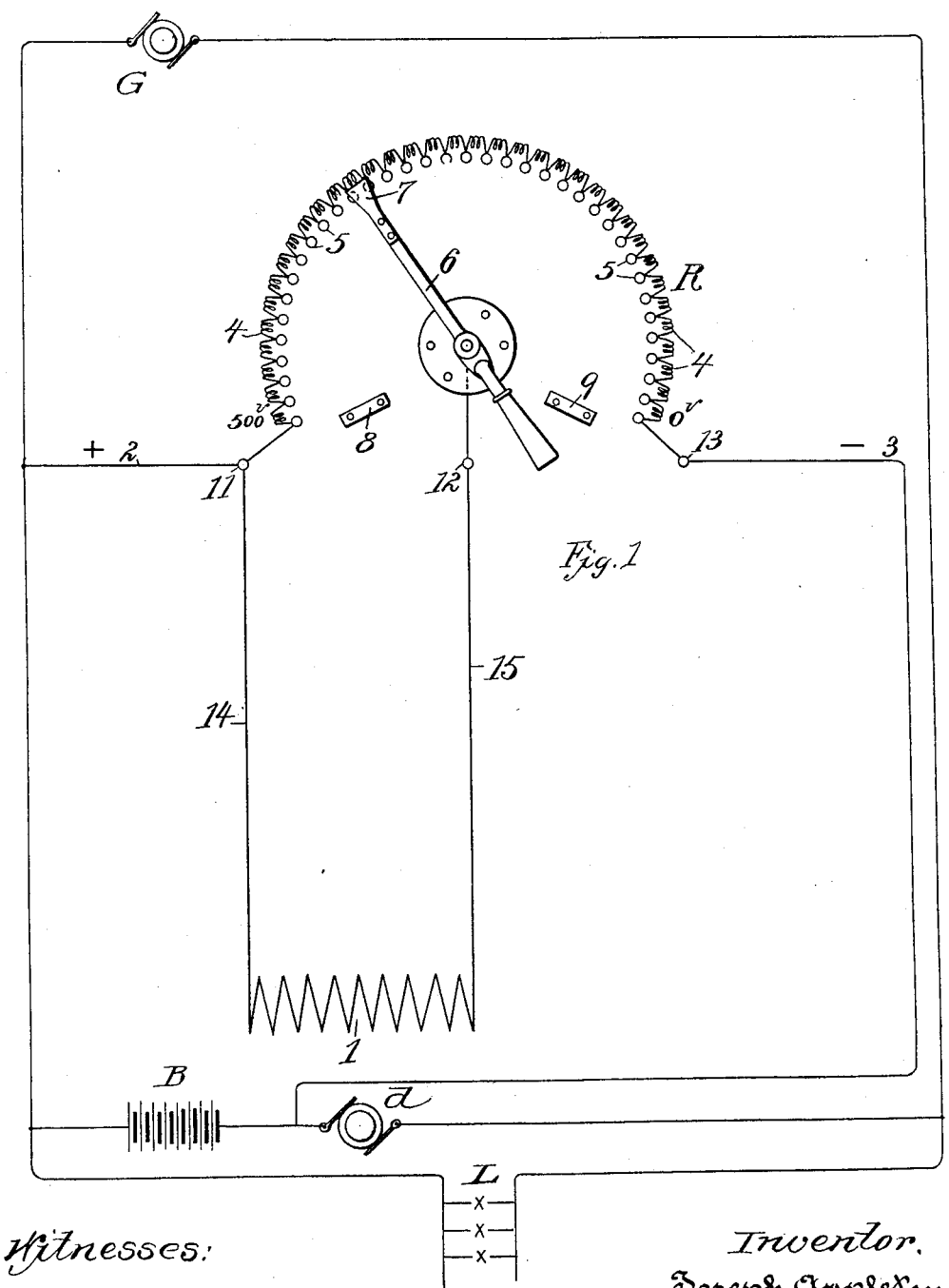

No. 657,722. Patented Sept. 11, 1900.
J. APPLETON.
MEANS FOR CONTROLLING EXCITATION OF BOOSTERS OR GENERATOR FIELDS.
(Application filed Mar. 30, 1899.)
(No Model.) 2 Sheets—Sheet 1.

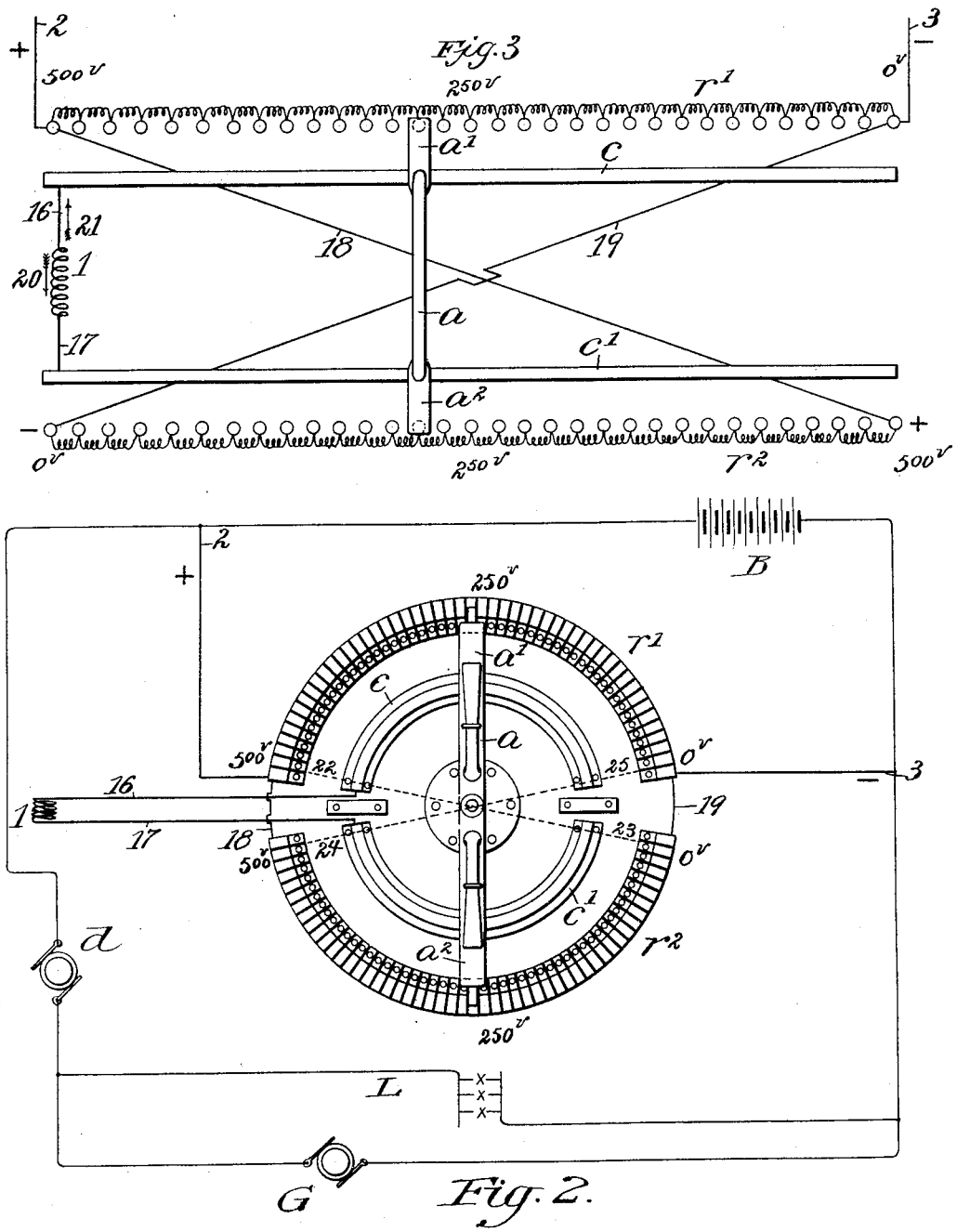

UNITED STATES PATENT OFFICE.

JOSEPH APPLETON, OF PHILADELPHIA, PENNSYLVANIA, ASSIGNOR TO THE ELECTRIC STORAGE BATTERY COMPANY, OF GLOUCESTER CITY, NEW JERSEY.

MEANS FOR CONTROLLING EXCITATION OF BOOSTERS OR GENERATOR-FIELDS.

SPECIFICATION forming part of Letters Patent No. 657,722, dated September 11, 1900.

Application filed March 30, 1899. Serial No. 711,131. (No model.)

*To all whom it may concern:*

Be it known that I, JOSEPH APPLETON, a subject of Her Majesty the Queen of Great Britain, residing at the city of Philadelphia, in the county of Philadelphia and State of Pennsylvania, have invented certain new and useful Means for Controlling the Excitation of Boosters or Generator-Fields, of which the following is a specification.

One object of the invention is to efficiently control the excitation of a booster or generator-field by means of a comparatively-small resistance and in such manner that the strength of the field may be varied from maximum to zero and also, if required, reversed in polarity without opening the field-circuit.

To this and other ends my invention, stated in general terms, comprises a resistance or resistances connected across any available source of current which will give an approximately-constant current and to different points of which the field-coil of the machine is connected, whereby the difference of potential at its terminus is varied, in contradistinction to the interposition in series with the field-coil of a resistance large enough to choke the current, and thus vary the field strength.

My invention further consists of the improvements which are hereinafter described and claimed.

The nature, characteristic features, and scope of my invention will be more fully understood from the following description, taken in connection with the accompanying drawings, forming part hereof, and in which—

Figure 1 is a view illustrating means embodying features of my invention and constructed to vary the field strength of a machine from zero to its maximum. Fig. 2 is a view showing like means constructed not only to vary the field strength, but also to reverse the polarity; and Fig. 3 is a diagrammatic view illustrative of the construction and arrangement of the apparatus shown in Fig. 2.

In the drawings, 1 is the field-coil of a dynamo-electric machine or booster of which the field strength is to be varied. $d$ is the armature thereof, and it is in series with the battery B. These two are connected in multiple-arc relation with the load-circuit L and main generator G.

2 and 3 indicate the leads from a source of current used to effect and vary the excitation of the field-coil 1. This source should not be the armature $d$, because there may not be in it the requisite voltage and polarity upon which to build the required excitation in the field-coil 1. As shown the source availed of is the battery B.

Referring to Fig. 1, R is a rheostat provided with subdivided resistance 4, having contacts 5, and with a movable arm 6, having a contact 7. The rheostat is provided with three terminals or binding-posts 11, 12, and 13, of which two, 11 and 13, are adapted for connection with the leads 2 and 3 and include between them the whole of the resistance, and of which the other, 12, is adapted for connection by way of the arm 6 and contact 7 with different points of the resistance for purposes to be hereinafter described. 8 and 9 are stops that may be employed for arresting the arm 6, and thus limiting its range of travel. 14 and 15 are conductors for connecting the ends of the coil 1 with the terminals 11 and 12. Between the ends of the resistance 4 there is a certain difference of potential. For example and for clearness of explanation it will be assumed that there is a potential of five hundred volts between the left-hand and right-hand ends of the resistance. This is indicated upon the drawings by reference to the characters "500" volts and "0" volts, so that between the right-hand end of the resistance and the successive contacts 5, proceeding in a clockwise direction, there are gradually-increasing differences in potential. If the contact-arm 6 were turned toward the right until it rested upon the extreme right-hand position, there would be a difference of potential of five hundred volts between the ends of the coil 1, or, in other words, between the conductor 14 and the conductor 15. This is the maximum difference in potential, so that the strength of the field-coil 1 would under these circumstances be at its maximum. As the arm 6 is turned in a counter-clockwise direction over the contacts 5 it reaches points between which and the extreme left-hand end there is less and less difference of potential, thus diminishing the strength of the field-coil until finally in its extreme left-hand position it rests upon the extreme left-hand contact, and under such circumstances there is no difference in potential and the strength of the field-coil is zero. There are branch paths between 2 and 3 for the current. One branch includes the conductor 14, the field-coil 1, the conductor 15, and the arm 6. The other branch includes more or less of the resistance 4, according to the position of the arm 6. As shown, it includes so much of the resistance as lies between the terminal 11 and the end 7 of the arm. The rest of the resistance might be regarded as a continuation of the lead 3.

Referring now to Figs. 2 and 3, in which the strength of the field-coil is not only varied, but is also reversed as to its polarity, I will first refer to Fig. 3, which is a diagrammatic representation of the arrangement of Fig. 2. In this figure $r'$ and $r^2$ represent similar portions of the resistance, and each of them is subdivided and provided with contacts. Between the ends of each of these portions $r'$ and $r^2$ of resistance there is a certain difference of potential, and it will be assumed to be five hundred volts and indicated by the reference characters "500" volts, "250" volts, and "0" volts. However, this difference in potential is in opposite directions in the two portions $r'$ and $r^2$ of resistance. For example, the portion $r'$ of resistance is connected across the leads 2 and 3 and the portion $r^2$ of resistance is connected across the leads by means of crossed conductors 18 and 19. The difference in potential between the portion $r'$ of resistance and the portion $r^2$ of resistance at the left-hand end is five hundred volts in one direction, and at the right-hand end it is five hundred volts in the other direction, and at the middle points it is nothing. The field-coil 1 is connected by conductors 16 and 17 with conducting-strips $c$ and $c'$, and there is a movable arm $a$, whose ends $a'$ and $a^2$ are adapted to bridge and carry current from the contacts of the resistances $r'$ and $r^2$ to the conducting-strips $c$ and $c'$, respectively. Each of the ends $a'$ and $a^2$ should be wide enough to span two of the contacts of the resistance, so as to prevent breaking the circuit when they are shifted. When the arm $a$ is in its extreme left-hand position, the field-coil 1 is connected across the resistances $r'$ and $r^2$ at points of maximum difference in potential in one direction which may be indicated by the arrow 20, and the strength of the field-coil is therefore at its maximum in that direction. As the arm $a$ is shifted toward the right it operates to connect the field-coil 1 across points of the resistances between which the difference in potential is less, until finally when the arm occupies its central position the field-coil 1 is connected across points of the two resistances $r'$ and $r^2$, between which there is no difference in potential. Consequently no current traverses the field-coil, and its strength is zero. Under these circumstances the circuit through the field-coil is from 2, through more or less of the resistance $r'$, to $a'$, to $c$, to 16, through 1, to 17, to $c'$, through more or less of the resistance $r^2$, by 19, to 3. There are also two other paths for the current through the resistances $r'$ and $r^2$. When the arm $a$ is shifted from its intermediate position toward the right and as it moves from contact to contact, it includes the coil 1, across points of the resistance $r'$ and $r^2$, between which there is an increasing difference of potential, until finally when the arm reaches its extreme right-hand position it connects the coil 1 across points of maximum difference of potential. However, under these circumstances the current traverses the coil 1 in a direction that may be indicated by the arrow 21, so that the polarity of the field is reversed. When the arm $a$ is between the center line and the right-hand end of the resistances $r'$ and $r^2$, the circuit through the field-coil is by way of 18, more or less of resistance $r^2$, $a^2$, $c'$, 17, coil 1, 16, $c$, $a'$, more or less of the resistance $r'$, to 3. There are also other paths by way of the resistances $r'$ and $r^2$ for the current. Referring now to Fig. 2, the subdivisions of the resistance have their contacts arranged in circular form and the arm $a$ is pivoted, which renders the cross-over connections 18 and 19 unnecessary and causes the parts to assume the appearance of an ordinary rheostat $r$. In Fig. 2, and following the same assumptions as to voltage, the difference in potential between the ends of the subdivision of resistance $r'$ and also the resistance $r^2$ is five hundred volts. The difference in potential between the right-hand end of the resistance $r'$ and its middle point is two hundred and fifty volts, and the same is true of the resistance $r^2$, so that in the position shown the field-coil 1 is connected across points of the resistance $r'$ and the resistance $r^2$ between which there is no difference in potential. Consequently the strength of the field-coil is zero. When the arm $a$ is turned from the position shown in the drawings in a counter-clockwise direction, it connects the field-coil 1 across points of the resistances $r'$ and $r^2$ of increasing differences of potential, so that the strength of the field 1 is gradually increased in one direction, and when the arm $a$ occupies the position indicated by the dotted line 22 23, points of maximum difference of potential are connected by it through the coil 1, of which the strength is then at its maximum in the other direction. The circuit of the field-coil 1 under these circumstances is from 2 through more or less of the resistance $r'$, by $a'$, to $c$, to 16, through 1 to 17, to $c'$, by $a^2$, through more or less of the resistance $r^2$, by 19, to 3. Current is also traversing the resistances $r'$ and $r^2$. When the arm $a$ is turned in a clockwise direction out of the position shown in Fig. 2, the strength of the coil 1 is gradually increased, but in the other direction, because it is connected across points of the resistances $r'$ and $r^2$, between which there is an increasing difference of potential, until, finally, when the arm $a$ reaches the position indicated by the dotted line 24 25 the coil 1 is connected across points of the resistances $r'$ and $r^2$ between which there is a maximum difference in potential, and consequently a maximum strength in the field-coil 1. Under these circumstances the circuit of the coil 1 is from 2, by 18, through more or less of the resistance $r^2$, by $a^2$, by $c'$, to 17, through coil 1 to 16, by $c$, to $d'$, through more or less of the resistance $r'$ to 3. Inasmuch as the function of the resistance is to furnish various points between which there are differences of potential and across which the field-coil is connected at different points, it follows that it may be very much smaller than would be required if it were placed in series with the coil and used to vary its strength by choking more or less of the current.

It will be obvious to those skilled in the art to which my invention relates that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. Means for controlling the excitation of the field of a dynamo-electric machine or booster which comprise a source of current other than said dynamo or booster, and a resistance connected across said source of current and to different points of which the field-coil is connected, substantially as described.

2. Means for controlling the excitation of the field-coil of a dynamo-electric machine or booster which comprise a source of current other than said dynamo or booster, a pair of resistances connected across said source of current, and means for connecting the terminals of the field-coil to various points of the same, to vary both potential and polarity of the field, substantially as described.

JOSEPH APPLETON.

Witnesses:
   A. B. STOUGHTON,
   THEODORA HESSER.